US012741736B2

(12) United States Patent
Remes

(10) Patent No.: US 12,741,736 B2
(45) Date of Patent: Sep. 22, 2026

(54) AERONAUTICAL VEHICLE AND METHOD OF TRANSITIONING BETWEEN FLIGHT MODES FOR AN AERONAUTICAL VEHICLE

(71) Applicant: TECHNISCHE UNIVERSITEIT DELFT, Delft (NL)

(72) Inventor: Bart Diane Walter Remes, Delft (NL)

(73) Assignee: TECHNISCHE UNIVERSITEIT DELFT, Delft (NL)

(*) Notice: Subject to any disclaimer, the term of this patent is extended or adjusted under 35 U.S.C. 154(b) by 63 days.

(21) Appl. No.: 18/860,258

(22) PCT Filed: Apr. 25, 2023

(86) PCT No.: PCT/EP2023/060732
§ 371 (c)(1),
(2) Date: Oct. 25, 2024

(87) PCT Pub. No.: WO2023/208887
PCT Pub. Date: Nov. 2, 2023

(65) Prior Publication Data

US 2025/0296675 A1 Sep. 25, 2025

(30) Foreign Application Priority Data

Apr. 26, 2022 (NL) ...................................... 2031701

(51) Int. Cl.
*B64C 3/56* (2006.01)
*B64C 29/00* (2006.01)
(Continued)

(52) U.S. Cl.
CPC ................ *B64C 3/56* (2013.01); *B64C 29/00* (2013.01); *B64U 10/20* (2023.01); *B64U 20/50* (2023.01); *B64U 30/293* (2023.01); *B64U 30/12* (2023.01)

(58) Field of Classification Search
CPC .... B64U 30/296; B64U 30/293; B64U 40/10; B64U 10/20; B64U 20/50; B64C 3/38; B64C 3/56; B64C 11/46; B64C 29/00
See application file for complete search history.

(56) References Cited

U.S. PATENT DOCUMENTS 3,721,403 A * 3/1973 Gray ........................ B64C 27/22 244/7 A
3,971,535 A * 7/1976 Jones ........................ B64C 3/40 244/46

(Continued)

FOREIGN PATENT DOCUMENTS

KR 102110911 B1 5/2020
RU 2733678 C1 10/2020

OTHER PUBLICATIONS

International Search Report for PCT/EP2023/060732 dated Jul. 17, 2023 (5 pages).

*Primary Examiner* — Jessica B Wong
(74) *Attorney, Agent, or Firm* — Tutunjian & Bitetto, P.C.

(57) ABSTRACT

An aeronautical vehicle performs horizontal flight and/or vertical flight, and has a fuselage, a wing assembly having a first wing part and a second wing part rigidly coupled to one another, a rotor assembly, a horizontal thruster, and an attitude control system. The wing assembly is arranged rotatably with respect to the fuselage to rotate about a vertical pivot axis between a stow position and an active position. The rotor assembly includes two vertical thrust rotors arranged on a rotor support rotatably with respect to the fuselage to rotate the rotor assembly between a stow position and an active position. In a horizontal flight mode the wing assembly is in the active position and the rotor assembly is in the stow position, and in a vertical flight mode the wing assembly is in the stow position and the rotor assembly is in the active position.

16 Claims, 6 Drawing Sheets

(51) Int. Cl.

| | |
|---|---|
| ***B64U 10/20*** | (2023.01) |
| ***B64U 20/50*** | (2023.01) |
| ***B64U 30/293*** | (2023.01) |
| *B64U 30/12* | (2023.01) |

(56) References Cited

U.S. PATENT DOCUMENTS

| | | | | |
|---|---|---|---|---|
| 4,132,374 | A * | 1/1979 | Abell | B64C 3/40<br>244/46 |
| 4,691,878 | A * | 9/1987 | Vaughan | B64C 27/28<br>416/142 |
| 8,444,082 | B1 * | 5/2013 | Foch | B64U 70/50<br>244/49 |
| 10,343,762 | B2 * | 7/2019 | Ross | B64C 3/38 |
| 10,800,510 | B2 * | 10/2020 | Olson | B64C 29/0033 |
| 11,787,539 | B2 * | 10/2023 | Li | B64C 9/00<br>244/7 A |
| 11,873,088 | B1 * | 1/2024 | Panthera | B64C 3/56 |
| 2010/0078526 | A1 * | 4/2010 | Mulero Valenzuela | B64C 27/26<br>244/7 A |
| 2016/0207625 | A1 | 7/2016 | Judas et al. | |
| 2016/0243910 | A1 * | 8/2016 | Hu | B64C 27/30 |
| 2016/0347446 | A1 | 12/2016 | Vetter et al. | |
| 2018/0079500 | A1 * | 3/2018 | Foskey | B64C 7/02 |
| 2020/0010183 | A1 * | 1/2020 | Kizhakkepat | B64C 27/50 |
| 2021/0107620 | A1 * | 4/2021 | Weekes | B64C 29/0025 |
| 2022/0315215 | A1 * | 10/2022 | Li | B64U 10/20 |
| 2023/0331380 | A1 * | 10/2023 | Ivans | B64C 3/56 |

* cited by examiner

AERONAUTICAL VEHICLE AND METHOD OF TRANSITIONING BETWEEN FLIGHT MODES FOR AN AERONAUTICAL VEHICLE

FIELD OF THE INVENTION

The invention relates to an aeronautical vehicle configured to perform horizontal flight, vertical flight and/or combinations thereof. The aeronautical vehicle may e.g. be an aircraft and/or unmanned aerial vehicle (UAV).

BACKGROUND OF THE INVENTION

Such an aeronautical vehicle is often referred to as a hybrid VTOL (i.e. vertical take-off or landing) aircraft or hybrid VTOL UAV. The vehicle may be required to perform horizontal flight and vertical flight—e.g. vertical take-off and/or landing and/or hover—in a variety of conditions, e.g. weather conditions. As such the aeronautical vehicle may encounter a variety of flight requirements.

The aeronautical vehicle typically maintains its orientation during different flight phases such as taking-off, cruising or landing. In horizontal flight the aeronautical vehicle flies in a plane substantially parallel to the ground, typically with the longitudinal axis of the plane being substantially parallel to the ground. In vertical flight the aeronautical vehicle flies in a plane substantially perpendicular to the ground, typically with the longitudinal axis of the plane being substantially parallel to the ground.

Known hybrid VTOL aircraft/UAVs utilise rotorcraft to perform vertical flight, but cruise in horizontal flight like an airplane by using lift provided by the wings and a horizontal thruster for propelling the vehicle forward.

Some hybrid VTOL aircraft/UAVs have a fixed configuration with a wing and a set of rotors. Transitioning between vertical and horizontal flight is achieved by tiling of the rotors and/or wings. However, due to the fixed configuration the aircraft/UAV cannot perform optimally in either vertical flight or horizontal flight due to (air flow) disturbances from the wing and/or rotors. This is especially of importance in severe and/or adverse weather conditions. To combat this, other hybrid VTOL aircraft/UAVs can transition in-flight between a vertical flight mode—in which rotors are utilised for vertical thrust and the wing is stowed away—and a horizontal flight mode, in which the wing and the horizontal thruster are utilised for lift and forward thrust, respectively, and the rotors are stowed away.

In US2016347446 is disclosed a hybrid VTOL/high speed aircraft that can transition in-flight between flight modes, i.e. a VTOL mode and a 'swing-wing' high speed aircraft mode. This is achieved by using wings that can fold in and out relative to the fuselage, and propeller pods mounted on stub wings that can be swivelled in and out relative to the fuselage. Transitioning between the modes is therefore cumbersome, and relies on multiple mechanically complex folding/swivelling systems, which systems disadvantageously increase the weight of the aeronautical vehicle.

SUMMARY OF THE INVENTION

It is an object of the invention to provide an alternative aeronautical vehicle. It is a further object to provide an aeronautical vehicle that allows for convenient transitioning between flight modes. It is yet a further object to provide a light-weight aeronautical vehicle.

This object is achieved by an aeronautical vehicle configured to perform horizontal flight, vertical flight or a combination thereof, the aeronautical vehicle having a longitudinal axis, a lateral axis and a vertical axis, and comprising a fuselage extending along the longitudinal axis, and a wing assembly having a first wing part and a second wing part being rigidly coupled to one another, wherein the first wing part and the second wing part extend in opposite directions, the aeronautical vehicle further comprising a rotor assembly, and at least one horizontal thruster for horizontal thrust, and an attitude control system, wherein the wing assembly is arranged rotatably with respect to the fuselage about a first pivot axis extending vertically at a first location on the fuselage, wherein the wing assembly is configured to be driven to rotate between a wing assembly stow position in which the wing assembly extends substantially parallel to the longitudinal axis, and a wing assembly active position in which the wing assembly extends substantially orthogonally to the longitudinal axis and the vertical axis, wherein the rotor assembly comprises two vertical thrust rotors being arranged on a rotor support at a distance from each other along a line, wherein the rotor support is arranged rotatably with respect to the fuselage about a second pivot axis extending vertically at a second location on the fuselage and on said line halfway between the vertical thrust rotors, wherein the rotor assembly is configured to be driven to rotate between a rotor assembly stow position in which said line extends substantially parallel to the longitudinal axis, and a rotor assembly active position in which said line extends substantially orthogonally to the longitudinal axis and the vertical axis, the aeronautical vehicle further comprising a drive system adapted to drive the rotation of the wing assembly between the wing assembly stow position and the wing assembly active position, and to drive the rotation of the rotor assembly between the rotor assembly stow position and the rotor assembly active position, wherein the aeronautical vehicle is operable to transition between a horizontal flight mode, in which the wing assembly is in the wing assembly active position and the rotor assembly is in the rotor assembly stow position, and a vertical flight mode, in which the wing assembly is in the wing assembly stow position and the rotor support is in the rotor assembly active position.

In the wing assembly active position the wing is positioned such that it provides lift in forward flight. The wing may be the main contributor to the lift, and/or the vertical rotors of the rotor assembly and/or further vertical rotors may provide additional lift. It is noted that the vertical rotors of the rotor assembly may not only be active when the rotor support is in the rotor assembly active position, but also may be active when the rotor support is in the rotor assembly stow position, or in any position in between the rotor assembly active position and the rotor assembly stow position. In the rotor assembly stow position, the vertical rotors may provide additional lift which allows for low-speed horizontal, forward flight.

The term vertical rotor is to be taken to indicate a rotor which mainly provides thrust in a vertical direction. A rotation axis of the rotor may be oriented vertically, or may be inclined to the vertical at an angle to mainly provide thrust in a vertical direction.

The vehicle according to the invention facilitates rotation of the wing assembly and the rotor assembly about the respective first and second pivot axes. The rotation of the wing assembly may be independent to the rotation of the rotor assembly, or these rotations may be coupled such that a rotation of the wing assembly leads to a rotation of the rotor assembly, either simultaneously or predetermined in time and/or in mutual position. The facilitated rotations are advantageous as they allow for a wide variety of configurations for the wing assembly and/or rotor assembly. Therefore, the configuration of the aeronautical vehicle can be tailored to the desired flight mode, e.g. horizontal flight mode, vertical flight mode, or a mode therebetween, possibly depending on external circumstances.

Advantageously, the vehicle according to the invention allows for a rotation of the wing assembly as a whole, e.g. similarly to an oblique wing, and it allows rotation of the rotor assembly as a whole. This leads on the one hand to convenient, simple and stable transitions between modes, and on the other to a light-weight vehicle due to reduced structural requirements.

The wing assembly may be spaced apart vertically from the fuselage, in particular be arranged higher than the fuselage, so as to facilitate rotations of the wing assembly without interference from the fuselage. The rotor assembly may be spaced apart vertically from the fuselage, in particular be arranged higher than the fuselage, so as to facilitate rotations of the rotor assembly without interference from the fuselage.

The wing assembly may be spaced apart vertically from the rotor assembly, e.g. to facilitate independent rotations of the wing assembly. Alternatively, the wing assembly and rotor assembly may substantially lie in the same plane.

The wing assembly may be a continuous wing comprising the first and second wing parts, or the wing assembly may comprise a structural element connecting the first and second wing parts.

The first wing part and/or second wing part of the wing assembly may e.g. be a straight wing or a swept wing. The latter means a wing that angles backward or forward from a wing root thereof, rather than in a straight lateral direction with respect to the fuselage as for the straight wing. Sweep angle is typically measured as the angle between a line along a span of the wing—at a constant fraction of a chord measured from a leading edge of the wing—and a line perpendicular to the longitudinal axis of the fuselage. This line may coincide with the lateral axis of the aeronautical vehicle.

As is the convention in the art, a positive longitudinal axis of the aeronautical vehicle points forward. A positive vertical axis points down, and a positive lateral axis then points to the left, completing a right-hand sided axis system. The axis system is fixed with respect to the aeronautical vehicle. Within the context of this disclosure, a pitch manoeuvre or moment is defined as a rotation or moment around the lateral axis of the aeronautical vehicle, a roll manoeuvre or moment is defined as a rotation or moment around the longitudinal axis of the aeronautical vehicle, and a yaw manoeuvre or moment is defined as a rotation or moment around the vertical axis of the aeronautical vehicle.

The attitude control system of the vehicle controls the attitude of the aeronautical vehicle by controlling and/or inducing pitch, roll and/or yaw moments. Yaw, pitch, and roll control can be achieved using the vertical rotors, the wing and control surfaces thereof, a tail and control surfaces thereof, a canard and control surfaces thereof and/or combinations thereof. This attitude control can be arranged differently depending on the flight mode.

The drive system adapted to drive the rotation of the wing assembly and the rotor assembly may rotate said wing assembly in the same direction as the rotor assembly, or in opposite directions. The latter arrangement may be beneficial to compensate moments as a result of the rotations. The former arrangement allows for a simple rotation.

The drive system adapted to drive the rotation of the wing assembly and the rotor assembly may be adapted to rotate said wing assembly and/or the rotor assembly fully around the respective first and second pivot axes to reach the wing assembly active position and wing assembly stow position, and the rotor assembly active position and rotor assembly stow position, respectively. That is, the drive system may allow for a 360 degree rotation or more. Alternatively, the drive system may be adapted to rotate the wing assembly and/or the rotor assembly a quarter-turn around the respective first and second pivot axes, such that after moving from one position to the other, to return to the initial position the drive system reverses the direction of rotation.

In an embodiment, the drive system is configured to drive the rotation of the wing assembly and the rotation of the rotor assembly simultaneously. This leads to efficient and simple transitioning, e.g. between the horizontal flight mode and the vertical flight mode, or vice versa.

In an embodiment, the drive system comprises a single motor and linkage to simultaneously drive the rotation of the wing assembly and the rotation of the rotor assembly. This leads to a low-weight vehicle due to the reduced number of parts required.

The linkage may comprise a worm gear. This is an efficient self-braking mechanism to keep the wing assembly and the rotor assembly in their relative (rotated) positions.

In a further embodiment, the single motor and linkage are arranged on the wing assembly or on the rotor support to drive the rotation thereof with respect to the fuselage at the first and second locations, respectively, about a vertically extending rotary shaft arranged on the wing assembly or the rotor support, the rotary shaft being coaxial with the first pivot axis and/or the second pivot axis.

In an embodiment, the drive system comprises a wing assembly drive motor and linkage to drive the rotation of the wing assembly with respect to the fuselage, and a rotor assembly drive motor and linkage to drive the rotation of the rotor support of the rotor assembly with respect to the fuselage.

The wing assembly linkage and/or the rotor assembly linkage may comprise a worm gear.

In an embodiment, the wing assembly drive motor and linkage are arranged on the wing assembly to drive the rotation of the wing assembly with respect to the fuselage at the first location about a vertically extending rotary shaft arranged on the fuselage, the rotary shaft being coaxial with the first pivot axis, or the wing assembly drive motor and linkage are arranged on the fuselage to drive the rotation of the wing assembly with respect to the fuselage at the first location about a vertically extending rotary shaft arranged on the wing assembly, the rotary shaft being coaxial with the first pivot axis.

In an embodiment, the rotor assembly drive motor and linkage are arranged on the rotor support to drive the rotation of the rotor assembly with respect to the fuselage at the second location about a vertically extending rotary shaft arranged on the fuselage, the rotary shaft being coaxial with the second pivot axis, or the rotor assembly drive motor and linkage are arranged on the fuselage to drive the rotation of the rotor assembly with respect to the fuselage at the second location about a vertically extending rotary shaft arranged on the rotor support, the rotary shaft being coaxial with the second pivot axis.

In a practical embodiment, the rotor support is rigidly coupled to the wing assembly, wherein the said line of the rotor support extends at an angle of 90 degrees to the extension of the first wing part and the second wing part.

This is advantageous as it leads to an efficient and simple coupled rotation of the rotor assembly and the wing assembly.

In yet another embodiment, said first location and/or said second location substantially coincides with the center of gravity of the aeronautical vehicle. This is advantageous for the (flight) stability of the vehicle.

In a further embodiment, the first pivot axis is coaxial with the second pivot axis.

In embodiments, the rotor assembly is configured to provide differential vertical thrust with its two vertical thrust rotors. This is beneficial as an additional source of attitude control.

In embodiments, the aeronautical vehicle comprises a second rotor assembly comprising two further vertical thrust rotors being arranged at a distance from each other along a second line extending substantially parallel to the fuselage. These further vertical thrust rotors provide additional lift.

The two further vertical thrust rotors of the second rotor assembly may be similarly powerful to, or more powerful than, the two vertical thrust rotors of the rotor assembly. The second rotor assembly may have a fixed position relative to the fuselage, e.g. extending parallel to said fuselage. The second rotor assembly may be arranged on a second rotor support, said support may be rotatable relative to the fuselage about a vertical pivot axis.

The second rotor assembly may be mechanically coupled to the wing assembly and/or the rotor support.

In an embodiment, the second rotor assembly is configured to provide differential vertical thrust with its two vertical thrust rotors. This is beneficial as an additional source of attitude control.

In a practical embodiment, the attitude control system comprises a position sensor system for determining the angular position of the rotor support relative to the fuselage and/or for determining the angular position of the wing assembly relative to the fuselage, wherein the attitude control system is configured to control control surfaces of the vehicle based on an angular position signal of the position sensor system. The position sensor system may comprise a potentiometer for determining the angular position of the rotor support relative to the fuselage and/or for determining the angular position of the wing assembly relative to the fuselage.

The invention further relates to a method of transitioning between flight modes for an aeronautical vehicle according to the invention, the method comprising the attitude control system performing the steps of:

- determining the desired flight mode and the corresponding desired angular positions for the wing assembly and the rotor support relative to the fuselage, e.g. the wing assembly active position or wing assembly stow position and/or rotor assembly active position or rotor assembly stow position, or angular positions therebetween,
- determining the current angular positions of the wing assembly and the rotor support relative to the fuselage,
- actuating the drive system to rotate the wing assembly from the current angular position to the desired angular position thereof, and/or to rotate the rotor support from the current angular position and the desired angular position thereof, e.g. rotation from the respective wing assembly active position and rotor assembly stow position of the horizontal flight mode to the respective wing assembly stow position and rotor assembly active position of the vertical flight mode, or vice versa.

In an embodiment, the method comprises the step of rotating the rotor support and the wing assembly simultaneously.

These and other aspects of the invention will be more readily appreciated as the same becomes better understood by reference to the following detailed description and considered in connection with the accompanying drawings in which like reference symbols designate like parts.

DETAILED DESCRIPTION OF EMBODIMENTS

FIGS. 1-4 show an aeronautical vehicle 1 configured to perform horizontal flight, vertical flight or a combination thereof. The aeronautical vehicle 1 has a longitudinal axis $L_V$, a lateral axis $T_V$ and a vertical axis $V_V$. The vehicle 1 comprises a fuselage 2 which extends along the longitudinal axis $L_V$, and a wing assembly 3 having a first wing part 3*a* and a second wing part 3*b* being rigidly coupled to one another. The first wing part 3*a* and the second wing part 3*b* extend in opposite directions. The wing assembly 3 is arranged rotatably with respect to the fuselage 2 about a first pivot axis $P_W$ extending vertically at a first location on the fuselage 2.

The wing assembly 3 is configured to be driven to rotate between a wing assembly stow position (e.g. shown in FIGS. 2 and 3) in which the wing assembly 3 extends substantially parallel to the longitudinal axis $L_V$, and a wing assembly active position (e.g. shown in FIG. 1) in which the wing assembly extends substantially orthogonally to the longitudinal axis $L_V$ and the vertical axis $V_V$.

The first wing part 3*a* and second wing part 3*b* are rigidly coupled to one another by a box structure 3*c*. The respective wing parts 3*a*, 3*b* are fixed at their roots to opposite sides of said box structure 3*c*.

Figure 1:
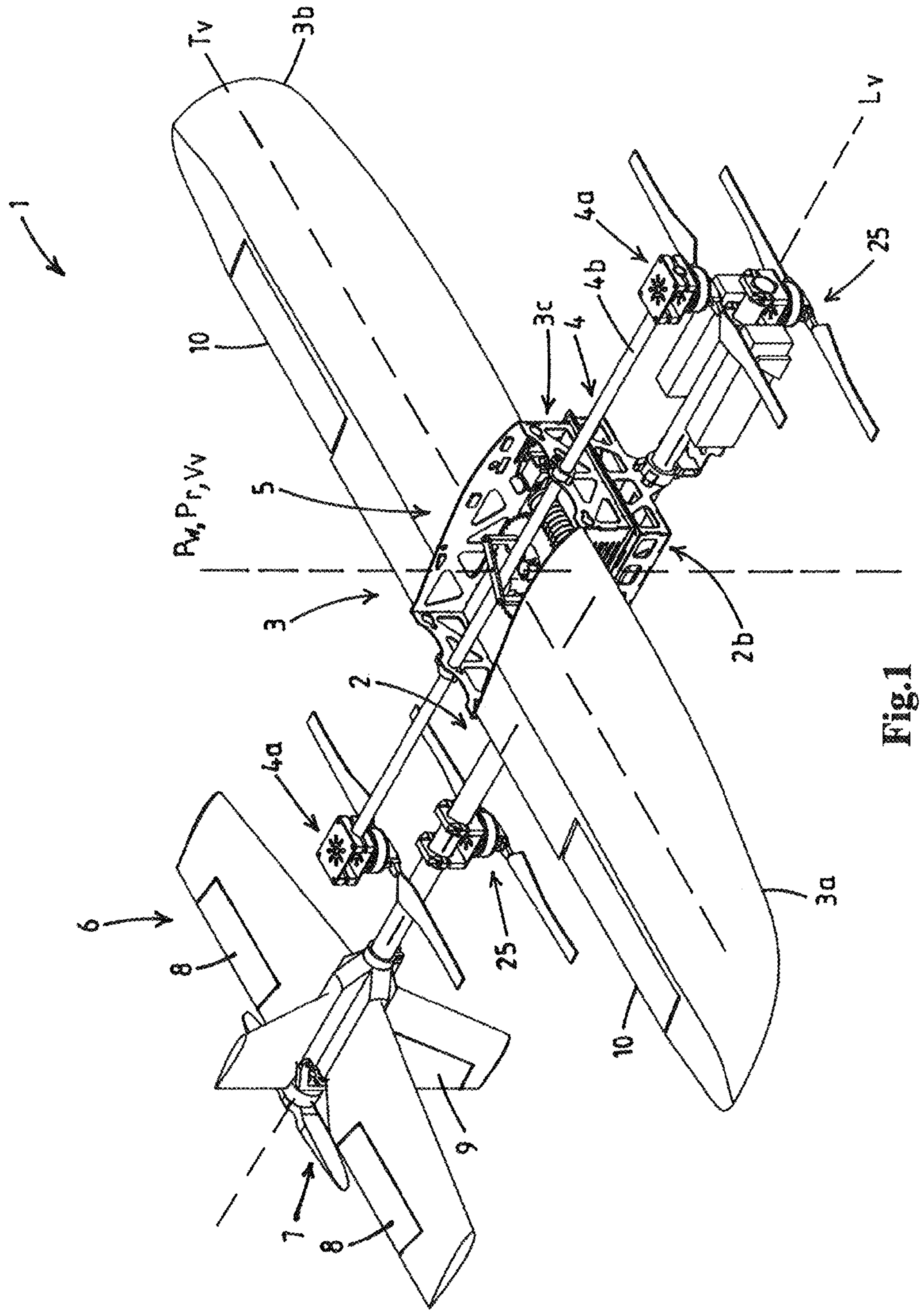
FIG. 1 schematically shows a view in perspective of an aeronautical vehicle according to the invention in a horizontal flight mode.
Figure 2:
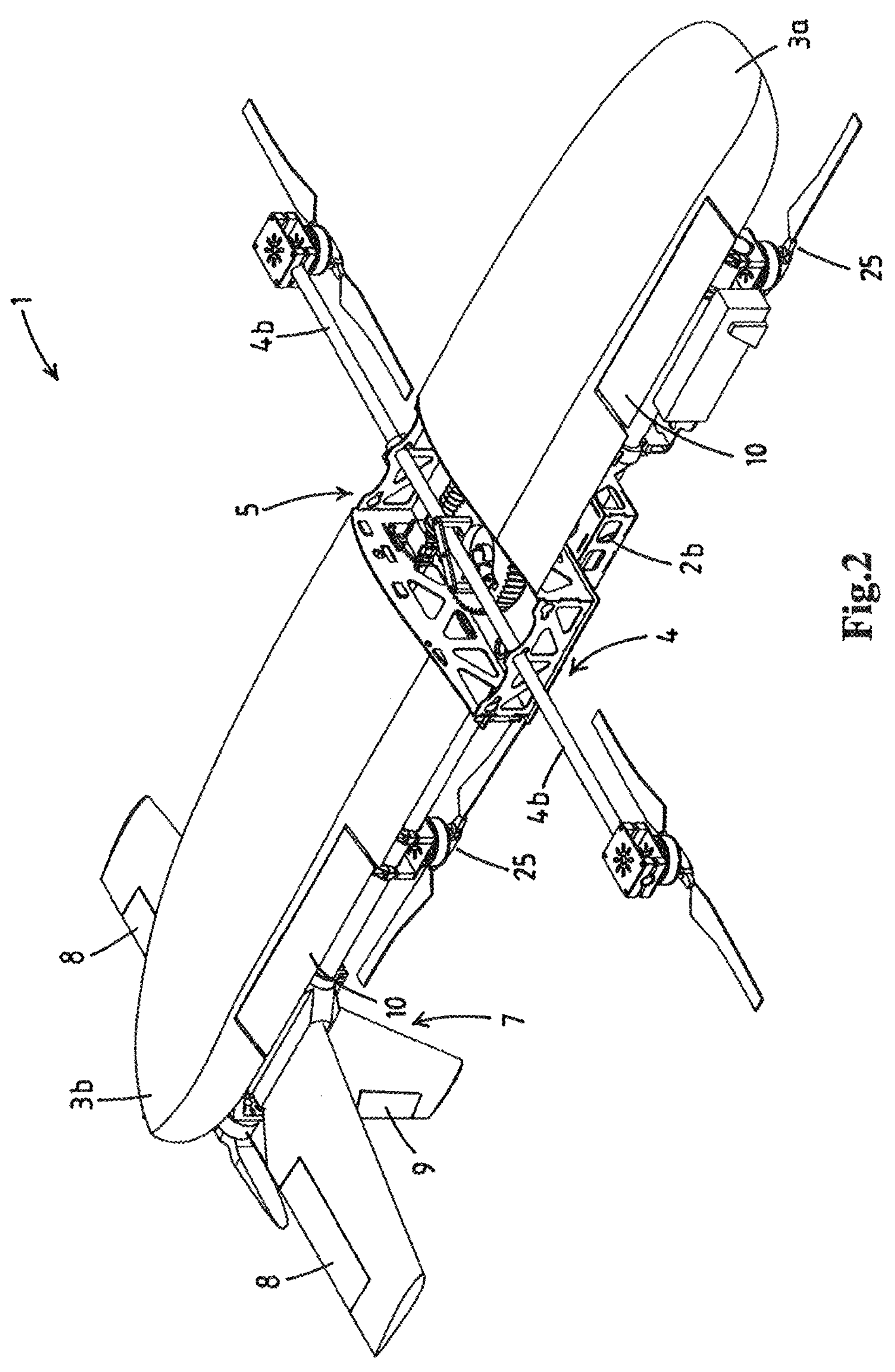
FIG. 2 schematically shows a view in perspective of the aeronautical vehicle of FIG. 1 in a vertical or horizontal flight mode.
Figure 3:
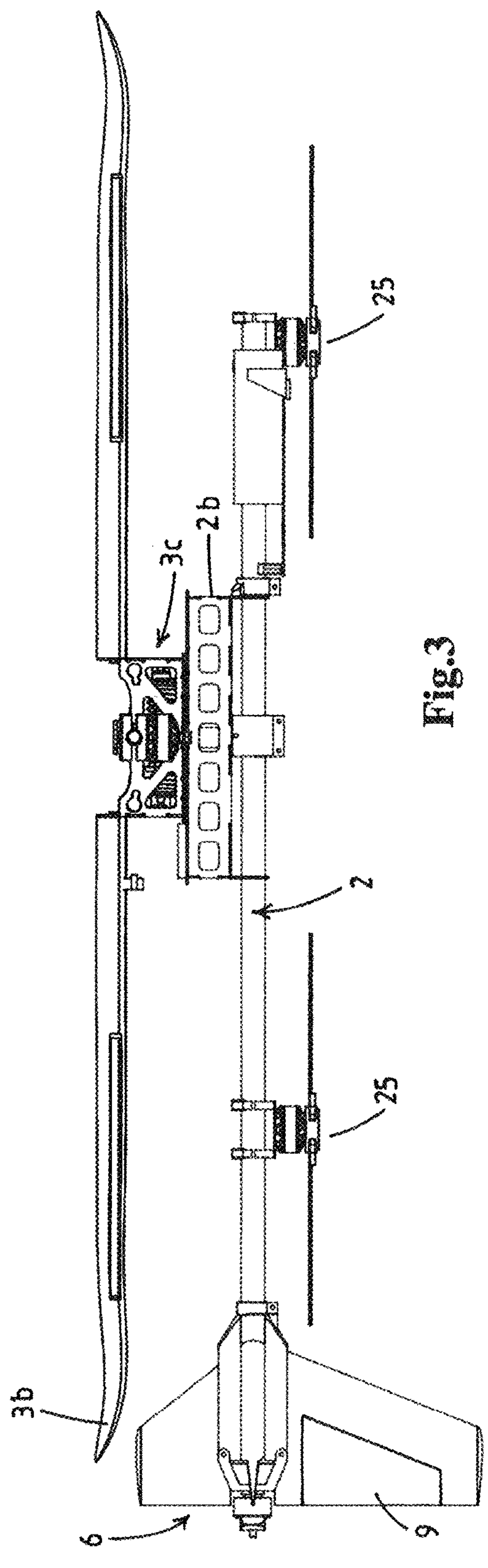
FIG. 3 schematically shows a side view of the aeronautical vehicle of FIG. 1 in the vertical or horizontal flight mode.

The wing assembly 3 can be seen in FIGS. 1-3 to be spaced apart vertically from, i.e. higher than, the fuselage 2, so as to facilitate rotations of the wing assembly 3 without interference from the fuselage 2.

The aeronautical vehicle 1 further comprises a rotor assembly 4, at least one horizontal thruster 7 for horizontal thrust, and an attitude control system.

The rotor assembly 4 comprises two vertical thrust rotors 4*a* being arranged on a rotor support 4*b* at a distance from each other along a line. The rotor support 4*b* is arranged rotatably with respect to the fuselage 2 about a second pivot axis $P_R$ extending vertically at a second location on the fuselage 2 and on said line halfway between the vertical thrust rotors 4*a*. In the example embodiment shown, the first pivot axis $P_W$ is coaxial with the second pivot axis $P_R$, preferably at the location of the center of gravity of the aeronautical vehicle.

The rotor support 4*b* is configured to be driven to rotate between a rotor assembly stow position (shown e.g. in FIG. 1) in which said line extends substantially parallel to the longitudinal axis $L_V$, and a rotor assembly active position in which said line extends substantially orthogonally to the longitudinal axis $L_V$ and the vertical axis $V_V$.

The rotor assembly 4 can be seen in FIGS. 1-3 to be spaced apart vertically from, i.e. higher than, the fuselage 2, so as to facilitate rotations of the rotor assembly 4 without interference from the fuselage 2

The aeronautical vehicle further comprises a drive system 5 adapted to drive the rotation of the wing assembly 3 between the wing assembly stow position and the wing assembly active position, and to drive the rotation of the rotor support 4*b* between the rotor assembly stow position and the rotor assembly active position.

In FIG. 1, the rotor support 4*b* can be seen to be rigidly coupled to the wing assembly 3, as the rotor support 4*b* extends through and is fixed to the box structure 3*c*. The said line of the rotor support 4*b* extends at an angle of 90 degrees to the extension of the first wing part 3*a* and the second wing part 3*b*, i.e. the lateral axis $T_V$.

The box structure 3*c* is shown to rotatably rest on structural element 2*b* of the fuselage. As such, element 2*b* forms a platform for the rotation of the wing assembly 3.

The aeronautical vehicle 1 is operable to transition between the horizontal flight mode which is shown in e.g. FIG. 1, in which the wing assembly 3 is in the wing assembly active position and the rotor support 4*b* is in the rotor assembly stow position, and a vertical flight mode which is shown in e.g. FIG. 2, in which the wing assembly 3 is in the wing assembly stow position and the rotor support 4*b* is in the rotor assembly active position.

The aeronautical vehicle 1 comprises an optional second rotor assembly comprising two vertical thrust rotors 25 being arranged at a distance from each other along a second line extending substantially parallel to the fuselage 2, i.e. extending parallel to the longitudinal axis $L_V$. The rotors 25 are fixed to the fuselage 2.

It is noted that the rotor assembly stow position as shown in FIGS. 2 and 3 not only allows for a vertical flight mode, but also allows for a horizontal flight mode. In the horizontal flight mode, one or both of the vertical thrust rotors 4*a* and/or one or both of the vertical thrust rotors 25 may provide lift, and the horizontal thruster 7 provides horizontal thrust.

The vehicle 1 is shown to have a tail assembly 6 having the control surfaces of elevators 8 and a rudder 9. The wing assembly 3 has the control surfaces of ailerons 10. The wing assembly 3 may further comprise flaps.

It is noted that the tail assembly 6 is here located at the rear of the fuselage 2. Alternatively, a canard may instead be provided at the front of the fuselage 2. The latter may be beneficial as it prevents downwash of the vertical rotors 4*a*, 25 affecting the air flow over the control surfaces of the canard (with it being in front of said rotors in the horizontal flight direction).

The attitude control system comprises a position sensor system 20, e.g. potentiometer, for determining the angular position of the rotor support 4*b* relative to the fuselage 2 and/or for determining the angular position of the wing assembly 3 relative to the fuselage 2, wherein the attitude control system is configured to control the control surfaces 8, 9, 10, the vertical thrust rotors 4*a*, 25, and the horizontal thrust rotor 7 of the vehicle based on an angular position signal of the position sensor system 20 and the desired flight mode.

Figure 4:
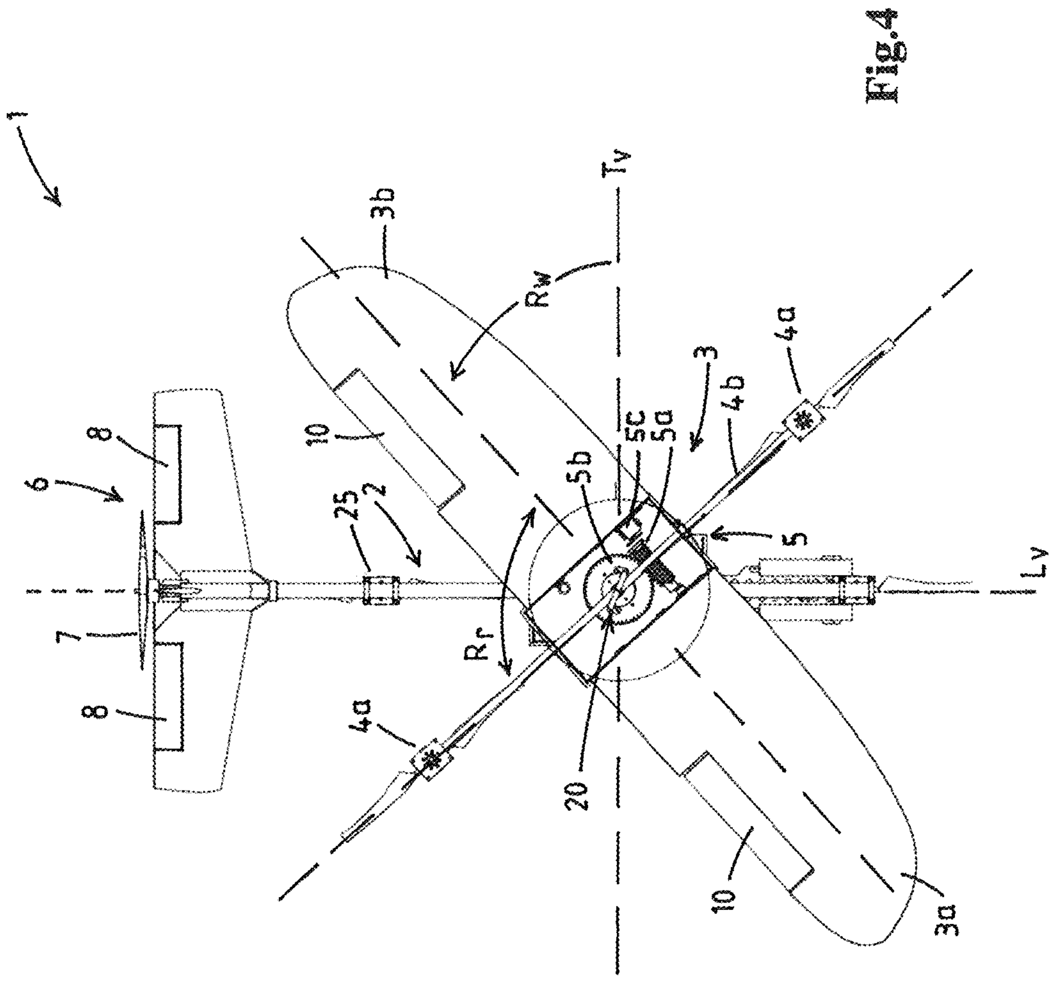
FIG. 4 schematically shows a top view of the aeronautical vehicle of FIG. 1 in a first rotated state.

In FIG. 4 it is depicted how the drive system 5 is configured to drive a rotation $R_W$ of the wing assembly 3 and a rotation $R_R$ of the rotor assembly 4 simultaneously. The drive system 5 comprises a single motor 5*c* and linkage to simultaneously drive a rotation of the wing assembly 3 and a rotation of the rotor assembly 4. The linkage comprises a worm gear 5*a* engaging and rotating around a cog 5*b* which is stationary with respect to the box structure 3*c*.

The single motor 5*c* and linkage are arranged on the wing assembly 3 to drive a rotation thereof with respect to the fuselage 2 between the wing assembly active position and the wing assembly stow position, respectively, about a vertically extending rotary shaft, here defined by cog 5*b*, arranged on the wing assembly 3. The cog 5 is coaxial with the first pivot axis $P_W$ and the second pivot axis $P_R$.

Figure 5:
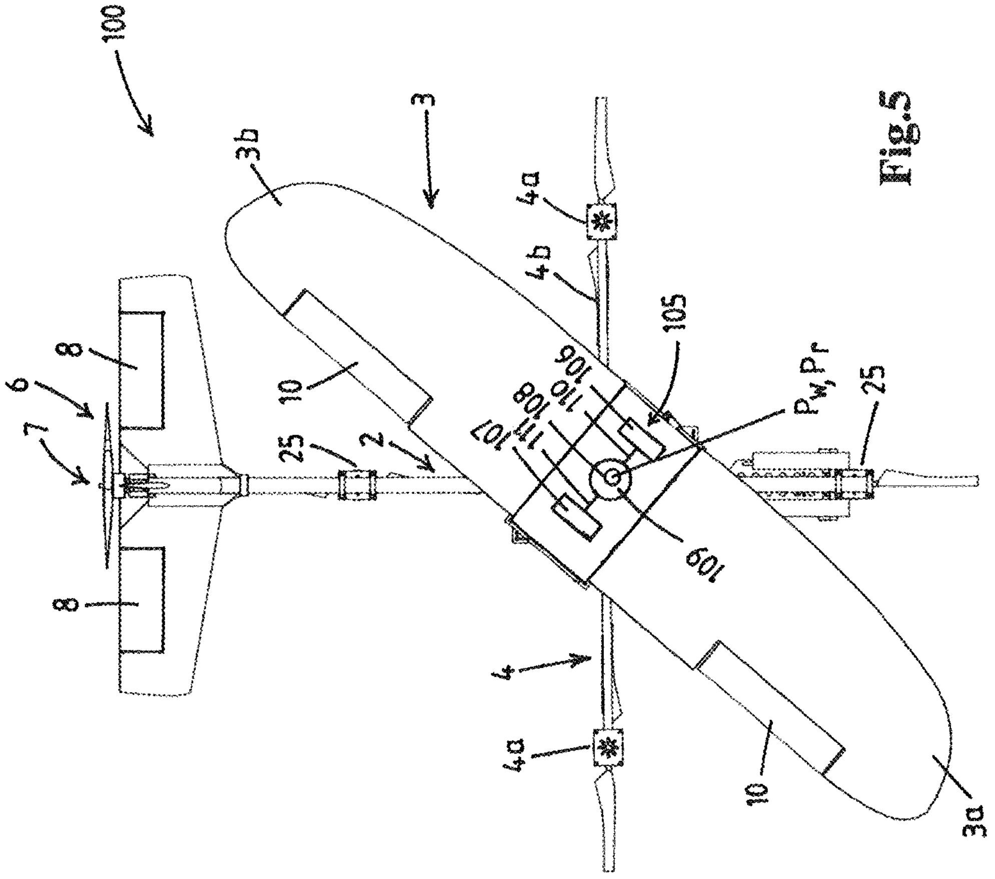
FIG. 5 schematically shows a top view of another aeronautical vehicle according to the invention in a second rotated state.

FIG. 5 depicts an aeronautical vehicle 100 configured to perform horizontal flight, vertical flight or a combination thereof. The vehicle 100 is shown in a state in which the rotor assembly 4 is in the rotor assembly active position, and the wing assembly 3 is in a position in between its wing assembly active position and wing assembly stow position. This may be achieved by a rotation of the wing assembly 3 which is separate from a rotation of the rotor assembly 4.

The vehicle 100 comprises a schematically depicted drive system 105 which comprises a wing assembly drive motor 106 and linkage 110 to drive the rotation of the wing assembly 3 with respect to the fuselage 2, and a rotor assembly drive motor 107 and linkage 111 to drive the rotation of the rotor support 4*b* of the rotor assembly 4 with respect to the fuselage 2.

The wing assembly drive motor 106 and linkage 110 may be arranged on the wing assembly 3 to drive the rotation of the wing assembly with respect to the fuselage 2 at the first location about a vertically extending rotary shaft 108 arranged on the fuselage 2, the rotary shaft 108 being coaxial with the first pivot axis $P_W$.

Alternatively, the wing assembly drive motor 106 and linkage 110 are arranged on the fuselage 2 to drive the rotation of the wing assembly 3 with respect to the fuselage 2 at the first location about a vertically extending rotary shaft 108 arranged on the wing assembly 3, the rotary shaft 108 being coaxial with the first pivot axis $P_W$.

The rotor assembly drive motor 107 and linkage 111 may be arranged on the rotor support 4*b* to drive the rotation of the rotor assembly 4 with respect to the fuselage 2 at the second location about a vertically extending rotary shaft 109 arranged on the fuselage 2, the rotary shaft 109 being coaxial with the second pivot axis $P_R$.

Alternatively, the rotor assembly drive motor 107 and linkage 111 are arranged on the fuselage 2 to drive the rotation of the rotor assembly 4 with respect to the fuselage 2 at the second location about a vertically extending rotary shaft 109 arranged on the rotor support 4*b*, the rotary shaft 109 being coaxial with the second pivot axis $P_R$.

In FIG. 5 the rotary shafts 108 and 109 are coaxial as they are coaxial with coaxial first and second pivot axes $P_R$, $P_W$.

Figure 6:
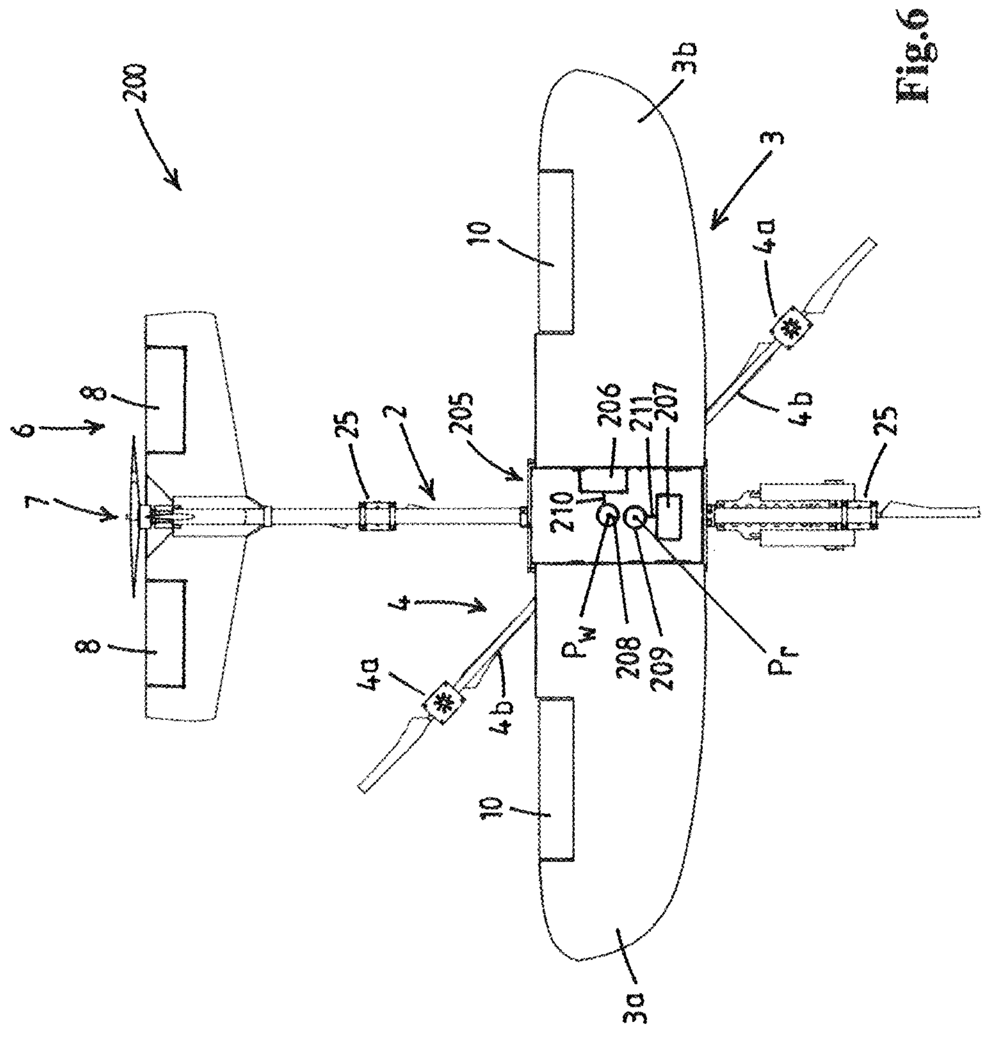
FIG. 6 schematically shows a top view of another aeronautical vehicle according to the invention in a third rotated state.

In FIG. 6 is shown an aeronautical vehicle 200 configured to perform horizontal flight, vertical flight or a combination thereof. The vehicle 200 is shown in a state in which the wing assembly 3 is in the wing assembly active position, and the rotor support 4*b* is in a position in between its rotor assembly active position and the rotor assembly stow position. This may be achieved by rotation of the rotor assembly 4 which is separate from a rotation of the wing assembly 3.

The vehicle 200 comprises a drive system 205 which comprises a wing assembly drive motor 206 and linkage 210 to drive the rotation of the wing assembly 3 with respect to the fuselage 2, and a rotor assembly drive motor 207 and linkage 211 to drive the rotation of the rotor support 4*b* of the rotor assembly 4 with respect to the fuselage 2.

The wing assembly drive motor 206 and linkage 210 may be arranged on the wing assembly 3 to drive the rotation of the wing assembly 3 with respect to the fuselage 2 at the first location about a vertically extending rotary shaft 208 arranged on the fuselage 2, the rotary shaft 208 being coaxial with the first pivot axis $P_W$.

Alternatively, the wing assembly drive motor 206 and linkage 210 are arranged on the fuselage 2 to drive the rotation of the wing assembly 3 with respect to the fuselage 2 at the first location about a vertically extending rotary shaft 208 arranged on the wing assembly 3, the rotary shaft 208 being coaxial with the first pivot axis $P_W$.

The wing assembly drive motor 206 and linkage 210 are provided to drive the rotation of the wing assembly 3 with respect to the fuselage 2 at the first location about a vertically extending rotary shaft 208. The rotary shaft 208 is coaxial with the first pivot axis $P_W$.

The rotor assembly drive motor 207 and linkage 211 are provided to drive the rotation of the rotor assembly 4 with respect to the fuselage 2 at the second location about a vertically extending rotary shaft 209 arranged on the fuselage 2.

The rotor assembly drive motor 207 and linkage 211 may be arranged on the rotor support 4*b* to drive the rotation of the rotor assembly 4 with respect to the fuselage 2 at the second location about a vertically extending rotary shaft 209 arranged on the fuselage 2, the rotary shaft 209 being coaxial with the second pivot axis $P_R$.

Alternatively, the rotor assembly drive motor 207 and linkage 211 are arranged on the fuselage 2 to drive the rotation of the rotor assembly 4 with respect to the fuselage 2 at the second location about a vertically extending rotary shaft 209 arranged on the rotor support 4*b*, the rotary shaft 209 being coaxial with the second pivot axis $P_R$.

The rotary shafts 208 and 209 are parallel. Contrary to the rotary shafts 108 and 109 in the arrangement of FIG. 5, in FIG. 6 the rotary shafts 208 and 209 are not coaxial.

As explained in detail above, an aeronautical vehicle performs horizontal flight and/or vertical flight, and has a fuselage, a wing assembly having a first wing part and a second wing part rigidly coupled to one another, a rotor assembly, a horizontal thruster, and an attitude control system. The wing assembly is arranged rotatably with respect to the fuselage to rotate about a vertical pivot axis between a wing assembly stow position and a wing assembly active position. The rotor assembly comprises two vertical thrust rotors being arranged on a rotor support rotatably with respect to the fuselage to rotate the rotor assembly between a rotor assembly stow position and a rotor assembly active position. The rotation of the wing assembly and the rotation of the rotor assembly is driven by a drive system. The vehicle is operable to transition between a horizontal flight mode, in which the wing assembly is in the wing assembly active position and the rotor assembly is in the rotor assembly stow position, and a vertical flight mode, in which the wing assembly is in the wing assembly stow position and the rotor assembly is in the rotor assembly active position.

As required, detailed embodiments of the present invention are disclosed herein. However, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms “a”/“an”, as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The term coupled, as used herein, is defined as connected, although not necessarily directly, and not necessarily mechanically.

The invention claimed is:

1. An aeronautical vehicle configured to perform horizontal flight, vertical flight or a combination thereof, the aeronautical vehicle having a longitudinal axis, a lateral axis and a vertical axis, and comprising a fuselage extending along the longitudinal axis, and a wing assembly having a first wing part and a second wing part being rigidly coupled to one another, wherein the first wing part and the second wing part extend in opposite directions, the aeronautical vehicle further comprising a rotor assembly, at least one horizontal thruster for horizontal thrust, and an attitude control system, wherein the wing assembly is arranged rotatably with respect to the fuselage about a first pivot axis extending vertically at a first location on the fuselage, wherein the wing assembly is configured to be driven to rotate between a wing assembly stow position in which the wing assembly extends substantially parallel to the longitudinal axis, and a wing assembly active position in which the wing assembly extends substantially orthogonally to the longitudinal axis and the vertical axis, wherein the rotor assembly comprises two vertical thrust rotors being arranged on a rotor support at a distance from each other along a line, wherein the rotor support is arranged rotatably with respect to the fuselage about a second pivot axis extending vertically at a second location on the fuselage and on said line halfway between the vertical thrust rotors, wherein the rotor assembly is configured to be driven to rotate between a rotor assembly stow position in which said line extends substantially parallel to the longitudinal axis, and a rotor assembly active position in which said line extends substantially orthogonally to the longitudinal axis and the vertical axis, the aeronautical vehicle further comprising a drive system adapted to drive the rotation of the wing assembly between the wing assembly stow position and the wing assembly active position, and to drive the rotation of the rotor assembly between the rotor assembly stow position and the rotor assembly active position, wherein the aeronautical vehicle is operable to transition between a horizontal flight mode, in which the wing assembly is in the wing assembly active position and the rotor assembly is in the rotor assembly stow position, and a vertical flight mode, in which the wing assembly is in the wing assembly stow position and the rotor assembly is in the rotor assembly active position.

2. The aeronautical vehicle according to claim 1, wherein the drive system is configured to drive the rotation of the wing assembly and the rotation of the rotor assembly simultaneously.

3. The aeronautical vehicle according to claim 1, wherein the drive system comprises a single motor and linkage to simultaneously drive the rotation of the wing assembly and the rotation of the rotor assembly.

4. The aeronautical vehicle according to claim 3, wherein the single motor and linkage are arranged on the wing assembly or on the rotor support to drive the rotation thereof with respect to the fuselage at the first and second locations, respectively, about a vertically extending rotary shaft arranged on the wing assembly or the rotor support, the rotary shaft being coaxial with at least one of the first pivot axis and the second pivot axis.

5. The aeronautical vehicle according to claim 1, wherein the drive system comprises a wing assembly drive motor and linkage to drive the rotation of the wing assembly with respect to the fuselage, and a rotor assembly drive motor and linkage to drive the rotation of the rotor support of the rotor assembly with respect to the fuselage.

6. The aeronautical vehicle according to claim 5, wherein the wing assembly drive motor and linkage are arranged on the wing assembly to drive the rotation of the wing assembly with respect to the fuselage at the first location about a vertically extending rotary shaft arranged on the fuselage, the rotary shaft being coaxial with the first pivot axis, or wherein the wing assembly drive motor and linkage are arranged on the fuselage to drive the rotation of the wing assembly with respect to the fuselage at the first location about a vertically extending rotary shaft arranged on the wing assembly, the rotary shaft being coaxial with the first pivot axis.

7. The aeronautical vehicle according to claim 4, wherein the rotor assembly drive motor and linkage are arranged on the rotor support to drive the rotation of the rotor assembly with respect to the fuselage at the second location about a vertically extending rotary shaft arranged on the fuselage, the rotary shaft being coaxial with the second pivot axis, or wherein the rotor assembly drive motor and linkage are arranged on the fuselage to drive the rotation of the rotor assembly with respect to the fuselage at the second location about a vertically extending rotary shaft arranged on the rotor support, the rotary shaft being coaxial with the second pivot axis.

8. The aeronautical vehicle according to claim 1, wherein the rotor support is rigidly coupled to the wing assembly, wherein the said line of the rotor support extends at an angle of 90 degrees to the extension of the first wing part and the second wing part.

9. The aeronautical vehicle according to claim 1, wherein at least one of said first location and said second location substantially coincides with the center of gravity of the aeronautical vehicle.

10. The aeronautical vehicle according to claim 1, wherein the first pivot axis is coaxial with the second pivot axis.

11. The aeronautical vehicle according to claim 1, wherein the rotor assembly is configured to provide differential vertical thrust with its two vertical thrust rotors.

12. The aeronautical vehicle according to claim 1, wherein the aeronautical vehicle comprises a second rotor assembly comprising two further vertical thrust rotors being arranged at a distance from each other along a second line extending substantially parallel to the fuselage.

13. The aeronautical vehicle according to claim 12, wherein the second rotor assembly is configured to provide differential vertical thrust with its two vertical thrust rotors.

14. The aeronautical vehicle according to claim 1, wherein the attitude control system comprises a position sensor system for determining at least one of the angular position of the rotor support relative to the fuselage and the angular position of the wing assembly relative to the fuselage, wherein the attitude control system is configured to control the control surfaces of the vehicle based on an angular position signal of the position sensor system.

15. A method of transitioning between flight modes for an aeronautical vehicle according to claim 1, the method comprising the attitude control system performing the steps of:

determining the desired flight mode and the corresponding desired angular positions for the wing assembly and the rotor support relative to the fuselage, determining the current angular positions of the wing assembly and the rotor support relative to the fuselage, and actuating the drive system to rotate at least one of the wing assembly from the current angular position to the desired angular position thereof, and the rotor support from the current angular position and the desired angular position thereof.

16. The method according to claim 15, comprising the step of driving the rotation of the rotor support and the wing assembly simultaneously.

* * * * *